United States Patent
Nedachi et al.

(10) Patent No.: US 8,306,714 B2
(45) Date of Patent: Nov. 6, 2012

(54) CLUTCH CONTROLLING APPARATUS FOR VEHICLE

(75) Inventors: Yoshiaki Nedachi, Saitama (JP); Hiroyuki Kojima, Saitama (JP); Kazuyuki Fukaya, Saitama (JP); Takashi Ozeki, Saitama (JP); Taito Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 666 days.

(21) Appl. No.: 12/461,573

(22) Filed: Aug. 17, 2009

(65) Prior Publication Data

US 2010/0082211 A1    Apr. 1, 2010

(30) Foreign Application Priority Data

Sep. 30, 2008   (JP) ................................ 2008-253374

(51) Int. Cl.
   *F16D 48/06*    (2006.01)
   *G06F 17/00*    (2006.01)
(52) U.S. Cl. ................ 701/67; 701/68; 477/77; 477/84; 477/180; 180/197
(58) Field of Classification Search .................... 701/67, 701/68; 477/180
See application file for complete search history.

(56) References Cited

U.S. PATENT DOCUMENTS

| | | | | |
|---|---|---|---|---|
| 4,874,070 A | * | 10/1989 | Nellums et al. | 477/84 |
| 5,427,215 A | * | 6/1995 | Jarvis | 192/3.63 |
| 7,235,037 B2 | * | 6/2007 | Bai et al. | 477/180 |
| 2002/0137595 A1 | * | 9/2002 | Markyvech et al. | 477/77 |
| 2005/0071065 A1 | * | 3/2005 | Zimmermann et al. | 701/51 |
| 2006/0205563 A1 | | 9/2006 | Bai et al. | |
| 2007/0244617 A1 | * | 10/2007 | Zenno | 701/67 |
| 2009/0271082 A1 | * | 10/2009 | Zenno | 701/68 |

FOREIGN PATENT DOCUMENTS

| | | |
|---|---|---|
| EP | 1 548 314 A2 | 6/2005 |
| GB | 2088007 A * | 6/1982 |
| JP | 2006-336853 | 12/2006 |
| JP | 2007-139120 | 6/2007 |

* cited by examiner

*Primary Examiner* — Thomas Black
*Assistant Examiner* — Lin B Olsen
(74) *Attorney, Agent, or Firm* — Squire Sanders (US) LLP

(57) ABSTRACT

A start permission decision section issues a start permission when an engine speed and a throttle valve opening become higher than predetermined values. A clutch-torque capacity storage section stores a clutch-torque capacity reference map in which a clutch-torque capacity is set as a function of at least the engine speed or as a function of the engine speed and the throttle valve opening. A clutch-torque capacity correction section corrects the clutch-torque capacity reference map so that the clutch-torque capacity is proportionally reduced in response to the difference between the engine speed and a start permission speed when a start permission is issued. An oil pressure controlling section connects the clutch with the clutch-torque capacity obtained in accordance with the corrected clutch-torque capacity map to start the vehicle.

13 Claims, 2 Drawing Sheets

CLUTCH CONTROLLING APPARATUS FOR VEHICLE

BACKGROUND

1. Field

Embodiments of the invention relate to a clutch controlling apparatus for a vehicle, and, more particularly, to a clutch controlling apparatus for a vehicle which can allow smooth start of the vehicle even if the engine speed has a dispersion arising from various conditions of the engine when a start map control is entered after a start permission decision.

2. Description of the Related Art

Previously, an automatic clutch controlling apparatus which can carry out start of a vehicle smoothly has been attempted. For example, Japanese Patent Laid-Open No. 2007-139120 proposes an automatic clutch controlling apparatus which can learn a clutch transmission torque characteristic which is used for clutch control upon starting. Meanwhile, Japanese Patent Laid-Open No. 2006-336853 proposes a clutch controlling apparatus which can carry out appropriate fastening force control for target torque regardless of drop of the coefficient of friction of a starter clutch or increase of the clearance between plates.

The clutch controlling apparatuses disclosed in Japanese Patent Laid-Open No. 2007-139120 and Japanese Patent Laid-Open No. 2006-336853 can cope with a case in which the clutch stroke amount varies by deterioration of a clutch apparatus or the like. However, these clutch controlling apparatuses fail to pay attention to the fact that an appropriate clutch-torque capacity of a starter clutch requires correction when a difference appears between an engine speed at a point of time of start permission decision and a current engine speed upon clutch connection.

For example, when a start permission decision is made and a start map control is entered, a dispersion appears in the engine speed depending upon various conditions of the engine. For example, where start permission conditions that the throttle opening is greater than 1 degree and the engine speed is higher than 1,200 rpm are set, since the engine speed corresponding to the throttle opening of 1 degree differs among different engines, start of the engine may be permitted at the engine speed of 1,200 rpm, or start of the engine may be permitted at 1,400 rpm. A start map sets the clutch-torque capacity using at least the engine speed as a parameter, and as the engine speed increases, a higher clutch-torque capacity is required. Therefore, a difference in start feeling appears depending upon the engine speed.

Initially, it is desirable that an engine starts with torque of a similar level if the throttle valve opens by a similar degree. However, since a start capacity of a clutch corresponding to an engine speed is read in from the start map, a clutch-torque capacity that differs depending upon a difference of the engine speed upon a start permission is read in, and this gives rise to a difference in feeling of starting when the clutch is connected.

Particularly in fast idle, since the engine speed is high with respect to the throttle opening, if the throttle valve opening becomes large during fast idle and start is permitted, then a large clutch-torque capacity corresponding to the high engine speed during the fast idle is read. Therefore, since the clutch-torque capacity with which high torque transmission is carried out is set with respect to the degree of throttle opening operation, the start torque may become different from that experienced by the driver.

The object of some embodiments of the present invention resides in provision of a clutch controlling apparatus for a vehicle which can correct, when start permission conditions are satisfied, the value of the clutch-torque capacity with respect to the engine speed to enhance the start feeling.

SUMMARY

According to one embodiment, a clutch controlling apparatus for a vehicle is provided. The clutch controlling apparatus includes a clutch-torque capacity reference map in which a clutch-torque capacity is set as a function of engine speed or as a function of the engine speed and a throttle opening. A clutch is configured to transmit a driving force from an engine to a transmission in response to a start permission when both of the engine speed and the throttle opening become higher than a predetermined start permission speed and a predetermined permission opening. The clutch is controlled by the clutch controlling apparatus to start said vehicle. The clutch controlling apparatus also includes a map correction unit configured to correct the clutch-torque capacity reference map so that the clutch-torque capacity is reduced in a proportional manner in response to a difference between the engine speed and the start permission speed when the start permission is issued. The clutch controlling apparatus is configured to connect said clutch with the clutch-torque capacity obtained in accordance with the clutch-torque capacity map corrected by said map correction unit to start said vehicle.

According to another embodiment, a method for clutch control in a vehicle is provided. The method includes setting, in a clutch-torque capacity reference map, a clutch-torque capacity as a function of engine speed or as a function of the engine speed and a throttle opening. A clutch is configured to transmit a driving force from an engine to a transmission in response to a start permission when both of the engine speed and the throttle opening become higher than a predetermined start permission speed and a predetermined permission opening, and is controlled to start said vehicle. The method also includes correcting the clutch-torque capacity reference map so that the clutch-torque capacity is reduced in a proportional manner in response to a difference between the engine speed and the start permission speed when the start permission is issued. The method may further include connecting said clutch with the clutch-torque capacity obtained in accordance with the corrected clutch-torque capacity map to start said vehicle.

Another embodiment of the invention provides a clutch controlling apparatus for a vehicle. The clutch controlling apparatus includes setting means for setting, in a clutch-torque capacity reference map, a clutch-torque capacity as a function of engine speed or as a function of the engine speed and a throttle opening. A clutch is configured to transmit a driving force from an engine to a transmission in response to a start permission when both of the engine speed and the throttle opening become higher than a predetermined start permission speed and a predetermined permission opening, and is controlled to start said vehicle. The apparatus may also include correcting means for correcting the clutch-torque capacity reference map so that the clutch-torque capacity is reduced in a proportional manner in response to a difference between the engine speed and the start permission speed when the start permission is issued. The apparatus may further include connecting means for connecting said clutch with the clutch-torque capacity obtained in accordance with the corrected clutch-torque capacity map to start said vehicle.

BRIEF DESCRIPTION OF THE DRAWINGS

For proper understanding of the invention, reference should be made to the accompanying drawings, wherein.

DETAILED DESCRIPTION

Figure 1:
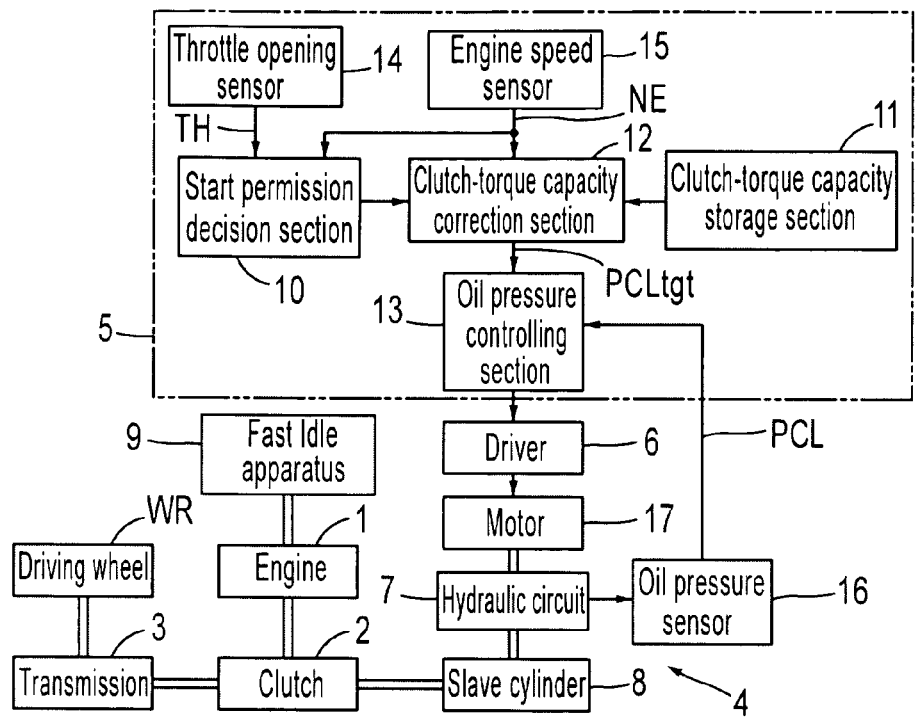
FIG. 1 is a block diagram showing a driving system for a vehicle including a clutch controlling apparatus according to an embodiment of the present invention.

In the following, an embodiment of the present invention is described with reference to the drawings. FIG. 1 is a block diagram showing a driving system for a vehicle including a clutch controlling apparatus according to an embodiment of the present invention. The driving system for a vehicle includes an engine 1, a clutch 2, a transmission 3, and a clutch controlling apparatus 4. The clutch controlling apparatus 4 may include a clutch electronic control unit (ECU) 5, a driver 6, a hydraulic circuit 7 and a slave cylinder 8. The oil pressure of the hydraulic circuit 7 can be adjusted by a piston (not shown) which is driven by a motor 17 as a hydraulic actuator.

In one embodiment, the clutch 2 is provided between an output power shaft (crankshaft) of the engine 1 and an input power shaft of the transmission 3, and connects or disconnects rotational driving force of the engine 1 to or from the transmission 3. The clutch 2 is driven by oil pressure supplied to the slave cylinder 8 from the hydraulic circuit 7 which is driven by the driver 6 in response to a result of processing by the clutch ECU 5. The output power shaft of the transmission 3 is connected to a driving wheel WR (rear wheel) through a chain or the like.

A fast idle apparatus 9 is provided for the engine 1. The fast idle apparatus 9 keeps, upon starting of the engine, a valve provided in a path for bypassing a throttle valve of the engine 1 at a high opening so that the engine speed becomes a fast idle speed. Then, after the engine starts, the fast idle apparatus 9 decreases the opening in response to a rise of the engine temperature, that is, in response to progress of the warming up operation, to automatically adjust the fast idling speed of the engine. After the warming up, the fast idle apparatus 9 may fully close the valve body.

The clutch ECU 5 includes a start permission decision section 10, a clutch-torque capacity storage section 11, a clutch-torque capacity correction section (map correction unit or means) 12 and an oil pressure controlling section 13. The start permission decision section 10, clutch-torque capacity storage section 11, clutch-torque capacity correction section 12 and oil pressure controlling section 13 can be configured from a microcomputer.

As sensors used for control in the clutch ECU 5, a throttle opening sensor 14 and an engine speed sensor 15 are provided. The sensors are widely known and may commonly be used for ignition control, fuel injection control and so forth of the start permission decision section 10.

The clutch-torque capacity storage section 11 can store a map in which the clutch-torque capacity, that is, the fastening force of the clutch 2, is set as a function of the engine speed NE. This map may be set such that the clutch-torque capacity increases in response to the engine speed NE (hereinafter described).

In one embodiment, the start permission decision section 10 decides, based on the throttle valve opening TH detected by the throttle opening sensor 14 and the engine speed NE detected by the engine speed sensor 15, whether or not the vehicle is in a state in which the start thereof can be permitted.

The clutch-torque capacity correction section 12 may correct the map stored in the clutch-torque capacity storage section 11 in response to the current engine speed NE. In particular, according to certain embodiments, the clutch-torque capacity correction section 12 corrects the map in response to the engine speed NE when the clutch-torque capacity is determined in accordance with the map stored in the clutch-torque capacity storage section 11.

The oil pressure controlling section 13 compares a clutch oil pressure target value PCLtgt, which may correspond to the clutch-torque capacity corrected by the clutch-torque capacity storage section 11, with a clutch oil pressure PCL detected by an oil pressure sensor 16 provided for the hydraulic circuit 7. The oil pressure controlling section 13 may then drive the driver 6 so that the clutch oil pressure PCL may converge to the clutch oil pressure target value PCLtgt. The driver 6 drives the motor 17, which is a hydraulic actuator, to control the oil pressure to be supplied from the hydraulic circuit 7 to the slave cylinder 8.

Figure 2:
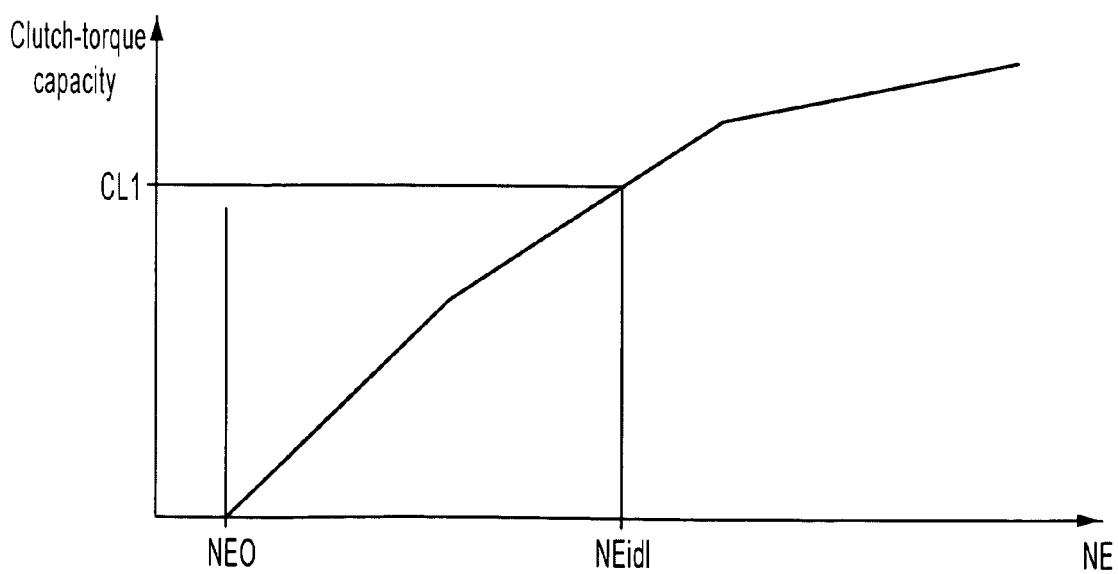
FIG. 2 is a view showing an example of a clutch-torque capacity map according to one embodiment.

FIG. 2 is a view illustrating an example of the clutch-torque capacity map stored in the clutch-torque capacity storage section 11, according to one embodiment. Referring to FIG. 2, the axis of abscissa indicates the engine speed NE, and the axis of ordinate indicates the clutch-torque capacity (that is, the oil pressure target value). As the clutch-torque capacity increases, the torque which can be transmitted from the engine 1 to the transmission 3 increases. A start permission speed NE0 is a permission speed set in advance to the start permission decision section 10. The start permission decision section 10 may output a start permission when the engine speed NE is higher than the start permission speed NE0 and/or when the throttle valve is opened to an extent exceeding a predetermined throttle opening (for example, 0.8 degree).

When the throttle opening becomes the start permission opening and the engine speed NE is NE0, then, if the clutch-torque capacity is increased along the map, the clutch can be connected smoothly. However, for example, in a case where the throttle opening becomes the start permission opening during fast idle, a fault occurs if the clutch-torque capacity is determined along this map. For example, if it is assumed that the fast idle speed is a speed NEidl higher than NE0, then if the throttle valve is opened in a manner exceeding the start permission opening during this fast idle, then the start permission decision section 10 issues a start permission. Consequently, a clutch-torque capacity CL1 is read out in accordance with the map of FIG. 2, and the hydraulic circuit 7 generates an oil pressure so that this clutch-torque capacity CL1 may be implemented. In particular, high torque is transmitted from the engine 1 to the transmission 3 from the beginning of the start, and the smoothness of the start is damaged.

Therefore, in one embodiment, the value of the clutch-torque capacity map is corrected and read out in response to the engine speed at a point of time at which a start permission is issued.

Figure 3:
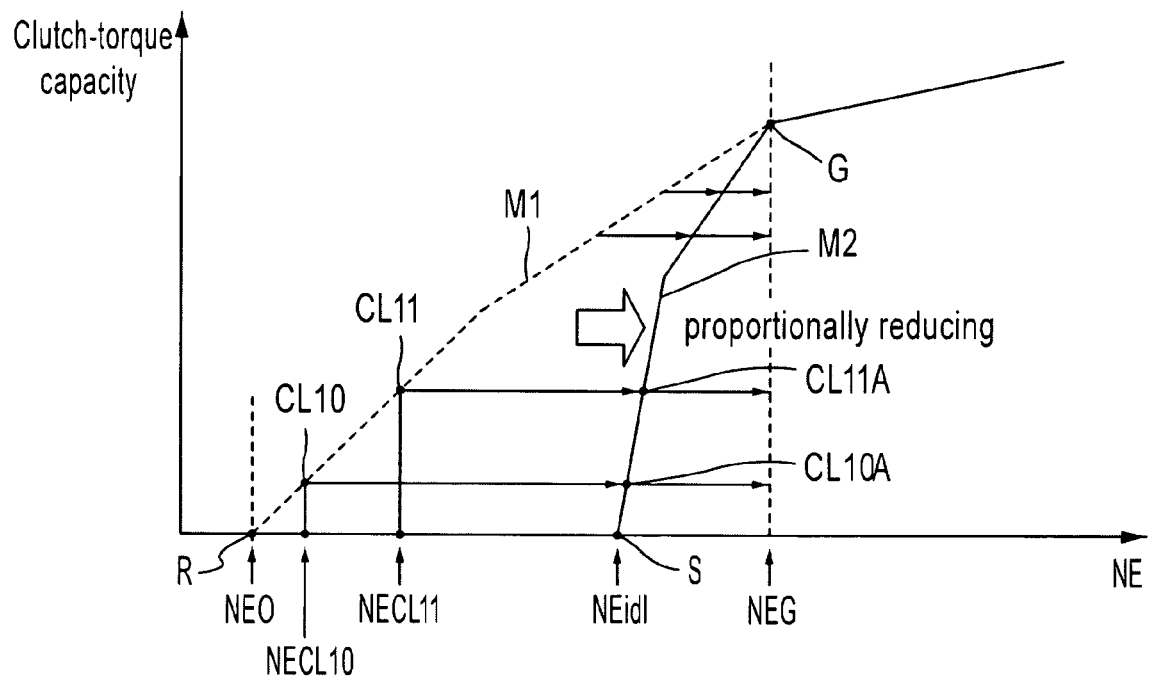
FIG. 3 is a view showing an example of the clutch-torque capacity map before and after correction according to one embodiment.

FIG. 3 is a view showing a clutch-torque capacity map and indicating an outline of a correction technique of the clutch-torque capacity, according to one embodiment. FIG. 3 illustrates a map (reference map) M1 in which the clutch-torque capacity increases as the engine speed NE increases from a reference point R at which the start permission speed NE0 and the current engine speed NE coincide with each other is set. Here, it is assumed that the engine speed at a point in time at which the conditions for the throttle opening are satisfied and a start permission is issued is a fast speed NEidl. The point of the speed NEidl is set as a changing point S of the map. Then, a point at which the map M1 before correction and a map M2 after the correction join together and coincide with each other is represented as joining point G. The clutch-torque capacity while the engine speed varies from the start permission speed NE0 to an engine speed NEG at the joining point G corresponds to so-called half clutch and is a state wherein, with the clutch-torque capacity corresponding to the engine speed NE higher than the joining point, the clutch engages substantially without a slip.

If the engine speed is the fast speed NEidl at a point in time at which a start permission is issued, then the map M2 in which the clutch-torque capacity is varied from the changing point S determined at the point of the speed NEidl to the joining point G. Although the map M2 may be defined so that the clutch-torque capacity varies linearly in a linear function from the changing point S to the joining point G, it should be understood that the map M2 varies in proportion to the map M1 as seen in FIG. 3.

In particular, where the engine speeds corresponding to the points R, S and G are represented by NE0, NEidl and NEG, respectively, the map M1 is reduced in accordance with the value of the ratio between (NEG-NEidl) and (NEidl-NE0) to configure the map M2.

For example, if (NEidl-NE0):(NEG-NEidl) is 7:3, then a point, at which the difference between the engine speed corresponding to an arbitrary point of the map M1 and the engine speed corresponding to the joining point G is internally divided at 7:3, is determined as a value of the map M2 corresponding to the arbitrary point of the map M1. For example, a point CL10A on the map M2 corresponding to a point CL10 on the map M1 in FIG. 3 corresponds to a point at which the (engine speed NEG)-(engine speed NECL10 corresponding to the point CL10) is internally divided at 7:3.

Similarly, a point CL11A on the map M2 corresponding to a point CL11 on the map M1 corresponds to a point at which the (engine speed NEG)-(engine speed NECL11 corresponding to the point CL11) is internally divided at 7:3.

Figure 4:
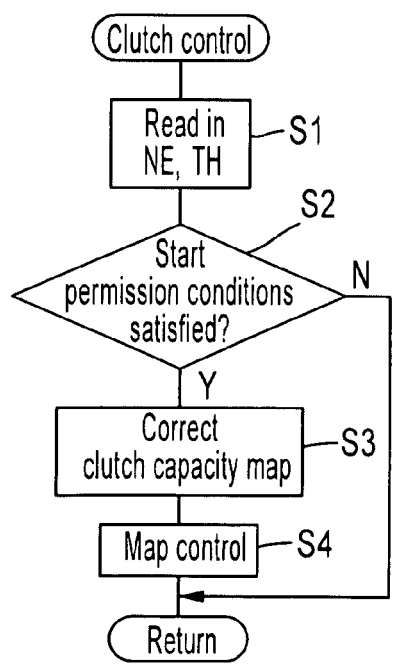
FIG. 4 is a flow chart of principal part of clutch control according to one embodiment.

FIG. 4 is a flow chart illustrating a process of essential part of start in accordance with an embodiment of the invention. Referring to FIG. 4, at step S1, an engine speed NE detected by the engine speed sensor 15 and a throttle valve opening TH detected by the throttle opening sensor 14 are read in. At step S2, it is determined whether or not the start permission conditions are satisfied depending upon whether or not the engine speed NE is higher than the start permission speed NE0 and the throttle valve opening TH is higher than the throttle valve opening TH. The start permission speed NE0 is, for example, 1,200 rpm, and the permission opening is 0.8 degree. In other words, if a throttle opening operation is carried out a little, then the start permission opening is reached.

If the start permission conditions are satisfied and a result of the decision at step S2 is in the affirmative, then the processing advances to step S3, at which the clutch-torque capacity map is corrected setting the current engine speed NE as the speed at the changing point S. An example of the correction is described with respect to FIG. 3.

At step S4, map control for determining the clutch-torque capacity in accordance with the corrected map M2 and with the current engine speed NE, and driving the hydraulic circuit 7 to connect the clutch, is carried out. The clutch-torque capacity increases as the engine speed increases.

It is to be noted that, in the embodiment described above, an example where the clutch-torque capacity map is set as a function of the engine speed NE is provided for simplicity of description. However, it should be understood that, in some embodiments, the clutch-torque capacity map may be set as a function of the engine speed NE and the throttle valve opening TH.

While, in the embodiment described above, the clutch-torque capacity correction section 12 produces the map M2 in which the clutch-torque capacity corresponding to the engine speed NE is proportionally reduced, the present invention is not limited to such an embodiment. For example, a correction coefficient (value lower than 1.0) may be set in response to the difference between the engine speed NE and the start permission speed NE0 such that a clutch-torque capacity set in the map M1 is multiplied by the correction coefficient to reduce the clutch-torque capacity.

It is to be noted that the correction of the clutch-torque capacity may not need to be carried out every time a start permission is issued. Rather, in some embodiments, the correction may be carried out when the difference between the engine speed NE and the start permission speed NE0, at the time of a start permission is issued, is greater than a predetermined value. Where the difference between the start permission speed NE0 and the engine speed NE when a start permission is issued is small, correction of the clutch-torque capacity may not carried out. By this, cumbersome correction can be prevented and the burden on the clutch ECU can be reduced.

Embodiments of the present invention include a clutch controlling apparatus for a vehicle. A clutch transmits a driving force from an engine to a transmission in response to a start permission when both of an engine speed and a throttle opening become higher than a predetermined start permission speed and a predetermined permission opening is connected to start the vehicle. The clutch controlling apparatus includes a clutch-torque capacity reference map in which a clutch-torque capacity is set as a function of at least the engine speed or the engine speed and the throttle opening. The clutch controlling apparatus also includes a map correction unit for correcting the clutch-torque capacity reference map so that the clutch-torque capacity is reduced in a proportional manner in response to a difference between the engine speed and the start permission speed when the start permission is issued. The clutch is connected with the clutch-torque capacity obtained in accordance with the clutch-torque capacity map corrected by the map correction unit to start the vehicle.

Further, the map correction unit may be configured so as to correct the clutch-torque capacity reference map when the difference between the engine speed and the start permission speed at the time of the start permission is issued is higher than a predetermined value.

Additionally, the map correction unit may be configured so as to linearly interpolate the clutch-torque capacity reference map in response to the difference between the engine speed and the start permission speed when the start permission is issued.

Further, the map correction unit may be configured so as to correct the clutch-torque capacity reference map by multiplication by a coefficient set in advance in response to the difference between the engine speed and the start permission speed when the start permission is issued.

Furthermore, according to embodiments of the present invention, the engine may include a fast idle apparatus.

Where the engine speed (current speed) when a start permission is issued is higher than the start permission speed, and if the clutch-torque capacity reference map is used in response to the current speed to determine a clutch-torque capacity, then the transmission torque upon starting sometimes becomes so high that the vehicle cannot be started smoothly. According to embodiments of the invention, when the current speed is higher than the start permission speed, the map is corrected such that the clutch-torque capacity may have an appropriate value in response to the difference between the current speed and the start permission speed. Therefore, the clutch-torque capacity corresponding to the start permission speed can be used to start connection of the clutch. Accordingly, the clutch connects smoothly, and the clutch-torque capacity increases in response to later increase of the engine speed. Consequently, the output torque of the engine can be transmitted to the transmission with certainty.

Since some embodiments are configured such that the clutch-torque capacity reference map is corrected when the difference between the current speed and the start permission speed is greater than the predetermined value, when a start permission is issued at a comparatively low speed, the clutch-torque capacity reference map can be used to start the vehicle.

According to another embodiment, the clutch-torque capacity reference map can be corrected simply and easily.

According to certain embodiments, when the throttle value is opened to carry out a starting operation while the engine having the fast idle apparatus is operating at a fast idle speed greatly higher than the start permission speed, a situation where the clutch-torque capacity reference map is referred to at the fast idle speed to determine a clutch-torque capacity can be prevented.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

DESCRIPTION OF REFERENCE NUMERALS

1 . . . engine,
2 . . . clutch,
3 . . . transmission,
4 . . . clutch controlling apparatus,
5 . . . clutch ECU,
7 . . . hydraulic circuit,
10 . . . start permission decision section,
11 . . . clutch-torque capacity storage section,
12 . . . clutch-torque capacity correction section.

We claim:

1. A clutch controlling apparatus for a vehicle, the clutch controlling apparatus comprising:
storage configured to store a clutch-torque capacity reference map in which a clutch-torque capacity is set as a function of engine speed or as a function of the engine speed and a throttle opening; and
a map correction unit configured to correct the clutch-torque capacity reference map so that the clutch-torque capacity is reduced in a proportional manner in response to a difference between the engine speed and a predetermined start permission speed when a start permission is issued,
wherein a clutch is configured to transmit a driving force from an engine to a transmission in response to the start permission when both of the engine speed and the throttle opening become higher than the predetermined start permission speed and a predetermined permission opening, respectively, and is controlled by the clutch controlling apparatus to start said vehicle moving,
wherein said clutch controlling apparatus is configured to connect said clutch with the clutch-torque capacity obtained in accordance with the clutch-torque capacity map corrected by said map correction unit to start said vehicle moving.

2. The clutch controlling apparatus according to claim 1, wherein said map correction unit is configured to correct the clutch-torque capacity reference map when the difference between the engine speed and the start permission speed, at the time the start permission is issued, is higher than a predetermined value.

3. The clutch controlling apparatus according to claim 1, wherein said map correction unit is configured to linearly interpolate the clutch-torque capacity reference map in response to the difference between the engine speed and the start permission speed when the start permission is issued.

4. The clutch controlling apparatus according to claim 1, wherein said map correction unit is configured to correct the clutch-torque capacity reference map by multiplication by a coefficient set in advance in response to the difference between the engine speed and the start permission speed when the start permission is issued.

5. The clutch controlling apparatus according to claim 1, wherein said engine includes a fast idle apparatus.

6. The clutch controlling apparatus according to claim 1, further comprising a fast idle apparatus configured to keep, upon starting the engine, a valve provided in a path for bypassing a throttle valve of the engine at a high opening so that the engine speed becomes a fast idle speed.

7. A method for clutch control in a vehicle, the method comprising:
setting, in a clutch-torque capacity reference map, a clutch-torque capacity as a function of engine speed or as a function of the engine speed and a throttle opening;
correcting the clutch-torque capacity reference map so that the clutch-torque capacity is reduced in a proportional manner in response to a difference between the engine speed and a predetermined start permission speed when a start permission is issued; and
connecting a clutch with the clutch-torque capacity obtained in accordance with the corrected clutch-torque capacity map to start said vehicle moving,
wherein the clutch is configured to transmit a driving force from an engine to a transmission in response to the start permission when both of the engine speed and the throttle opening become higher than the predetermined start permission speed and a predetermined permission opening, respectively, and is controlled to start said vehicle moving.

8. The method according to claim 7, wherein said correcting comprises correcting the clutch-torque capacity reference map when the difference between the engine speed and the predetermined start permission speed, at the time the start permission is issued, is higher than a predetermined value.

9. The method according to claim 7, wherein said correcting comprises linearly interpolating the clutch-torque capacity reference map in response to the difference between the engine speed and the start permission speed when the start permission is issued.

10. The method according to claim 7, wherein said correcting comprises correcting the clutch-torque capacity reference map by multiplication by a coefficient set in advance in response to the difference between the engine speed and the start permission speed when the start permission is issued.

11. The method according to claim 7, further comprising upon starting the engine, keeping, by a fast idle apparatus, a valve provided in a path for bypassing a throttle valve of the engine at a high opening so that the engine speed becomes a fast idle speed.

12. A clutch controlling apparatus for a vehicle, the clutch controlling apparatus comprising:

setting means for setting, in a clutch-torque capacity reference map, a clutch-torque capacity as a function of engine speed or as a function of the engine speed and a throttle opening;

correcting means for correcting the clutch-torque capacity reference map so that the clutch-torque capacity is reduced in a proportional manner in response to a difference between the engine speed and a predetermined start permission speed when a start permission is issued; and connecting means for connecting a clutch with the clutch-torque capacity obtained in accordance with the corrected clutch-torque capacity map to start said vehicle moving, wherein the clutch is configured to transmit a driving force from an engine to a transmission in response to the start permission when both of the engine speed and the throttle opening become higher than the predetermined start permission speed and a predetermined permission opening, respectively, and is controlled to start said vehicle moving.

13. The clutch controlling apparatus according to claim 12, further comprising keeping means for keeping, upon starting the engine, a valve provided in a path for bypassing a throttle valve of the engine at a high opening so that the engine speed becomes a fast idle speed.

* * * * *